United States Patent [19]

Kaufmann

[11] 4,225,374
[45] Sep. 30, 1980

[54] DECORATIVE FLOORING
[75] Inventor: John C. Kaufmann, Lancaster, Pa.
[73] Assignee: Armstrong Cork Company, Lancaster, Pa.
[21] Appl. No.: 898,456
[22] Filed: Apr. 20, 1978
[51] Int. Cl.² .............. B29C 17/04; B29C 21/00; B29D 7/14; B32B 31/18
[52] U.S. Cl. .................. 156/220; 156/230; 156/231; 156/235; 156/240; 156/247; 156/269; 156/289; 156/344; 264/118; 264/119; 264/264; 428/142; 428/172; 428/187
[58] Field of Search ............ 156/220, 231, 235, 240, 156/247, 269, 289, 344; 264/118, 119, 264; 428/142, 172, 187

[56] References Cited
U.S. PATENT DOCUMENTS

| 2,867,263 | 1/1959 | Bartlett | 156/231 X |
| 3,060,502 | 10/1962 | Snyder | 264/76 X |
| 3,400,036 | 9/1968 | Hemrick et al. | 428/142 |
| 3,804,657 | 4/1974 | Eyman et al. | 428/172 X |
| 3,887,678 | 6/1975 | Lewicki | 156/220 X |
| 3,923,941 | 12/1975 | Weaver | 156/247 X |
| 3,944,455 | 3/1976 | French | 156/361 |
| 4,041,200 | 8/1977 | Boranian et al. | 156/247 X |
| 4,076,867 | 2/1978 | Lewicki et al. | 156/220 X |
| 4,082,595 | 4/1978 | Slater | 156/351 |

Primary Examiner—John T. Goolkasian
Assistant Examiner—Robert A. Dawson

[57] ABSTRACT

A method for making a dimensionally stable decorative floor covering product. A sheet is first formed, and this is then provided with a decorative design. A clear wear layer is applied thereon, mechanically embossed-in-register, and then the sheet is cut into a plurality of individual tile units.

1 Claim, 1 Drawing Figure

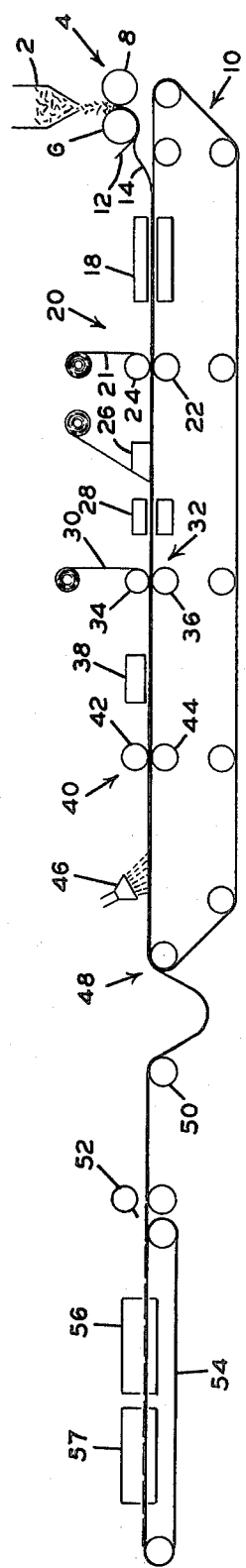

DECORATIVE FLOORING

BACKGROUND OF THE INVENTION

1. Field of the Invention

The invention is directed to a method of making a floor covering product and, more particularly, to the making of a dimensionally stable floor decorative mechanically embossed-in-register floor tile.

2. Description of the Prior Art

Most of the individual steps of the claimed process have been employed one time or another in the formation of a floor covering product. Most of the apparatuses used in the carrying out of the inventive process are standard floor covering manufacturing apparatuses.

The invention lies in the unique combination of the different apparatuses, especially the concept of adhering the base material to a nondistensible controlled release carrier that has hot adhesion and cold release to allow product formation without distortion in order to develop a series of method steps which provide a combination not in toto taught in the prior art. Such combination is capable of providing a unique dimensionally stable floor covering product which might be similar to those existing in the art, but clearly not of the quality and aesthetic appeal as formed by the method invention herein with the lower cost and higher production speed secured by the claimed invention.

SUMMARY OF THE INVENTION

The invention is directed to the making of floor tile. Chips or mass of thermoplastic material are calendered into a sheet form, and this sheet is deposited on and adhered with heat to a nondistensible controlled release carrier that has hot adhesion and cold release. While the sheet is adhered to the nondistensible controlled release carrier, it is provided with a printed design through the use of a preprinted transfer sheet. After the design has been transferred to the calendered thermoplastic material, the transfer sheet is removed and a clear film wear layer is applied to the calendered printed sheet still adhered to the nondistensible controlled release carrier. The lamination of the clear wear layer to the calendered sheet is carried out and followed by a mechanical embossing-in-register operation. Now there is provided a calendered sheet with an embossed and printed design covered by a clear wear layer. The calender sheet is then removed from the nondistensible controlled release carrier by cooling and cut into individual tile units. These are subsequently annealed to stress relieve the tile units and punched to final size.

BRIEF DESCRIPTION OF THE DRAWING

The FIGURE is a schematic diagram of the process flow for the inventive method herein.

DESCRIPTION OF THE PREFERRED EMBODIMENT

The invention herein is directed to a method for making a floor covering product. The method is carried out by depositing heated chips or a mass of small particles of thermoplastic material from a hopper 2 into a calender structure 4 which is composed of two rolls 6 and 8. Such a roll structure is shown in U.S. Pat. No. 3,060,502. The sheet tends to adhere to the cooler roll 6 and is carried around the roll and then deposited upon the heated nondistensible controlled release carrier 10 which, for example, is an endless reinforced silicone or Teflon TM belt carried between rollers. A knife structure 12 will strip the calendered sheet 14 from the roll 6 and deposit it upon the upper surface of the nondistensible controlled release carrier 10. The sheet 14 of consolidated thermoplastic material is then moved past conventional heaters 18 to achieve the correct temperature for adherence to the nondistensible controlled release carrier. From there it moves to a design application station 20 where a prepreinted transfer sheet 21 is moved down into contact with the calendered sheet 14. An upper rubber covered roll 24 and a lower steel roll 22 adhere the transfer sheet 21 to the calendered sheet 14 and the sheet 14 to the nondistensible controlled release carrier 10 to prevent distortion throughout the remaining steps of the process. Simultaneously, there is a transfer of the preprinted design on the transfer sheet to the upper surface of the calendered sheet 14. The transfer sheet has been preprinted with a design using conventional vinyl inks which form a design film and a registration band and thus there is utilized a decal-type transfer operation wherein the design and registration band on the transfer sheet with the application of heat and pressure adheres the vinyl film or decal-type printed image to the calendered sheet. When the transfer paper is removed from the calendered sheet, the printed design stays upon the upper surface of the calendered sheet 14 that remains adhered to the nondistensible controlled release carrier. A cooled plate structure 26 with an angled edge is used to assist in the stripping of the transfer paper from the calendered sheet. Heat is again applied to the calendered sheet with the printed design through the use of heaters 28 to achieve the required temperature for clear wear layer lamination and adherence. A clear wear layer coating 30 is then applied to the printed surface of the calendered sheet 14. The wear layer coating is laminated to the calendered sheet through the use of a laminating structure 32 uniquely mounted on a conventional Fife Guider that is used to provide AMD (across machine direction) embossing-in-register alignment. This structure includes an upper smooth steel roll 34 for even adherence of the clear film wear layer to the calendered sheet and a lower rubber roll 36. The sheet with the laminated wear layer 30 now passes by another heater structure 38 to achieve the correct temperature for embossing and then to the mechanical embossing-in-register roll assembly 40 which has an upper steel embossing roll 42 and a lower rubber roll 44. A water spray area 46 then cools the embossed-in-register composite sheet structure containing the wear layer film 30 and the calendered sheet 14. This enables the composite sheet to be stripped from the nondistensible controlled release carrier at point 48. The change of direction and cooling of the nondistensible controlled release carrier causes the separation of the two components. The composite sheet is then picked up by a vacuum drum 50 which then pushes the sheet past a fly knife cutter 52 to cut the sheet into individual sections. Since the sheet is roughly the width of an individual tile unit, the sheet is cut into a plurality of individual tile units. The cutting of the sheet into individual tile units is carried out in registration with the embossed and printed design on the sheet. Registration of the embossing and cutting is carried out through the use of conventional Bobst-Champlain registration control apparatuses. Stress relieving is accomplished by oven 56 and a cooling section 58. Final punching to size is done by a punch press.

The chips or particles of thermoplastic material which are utilized in the method herein may have the formulation such as set forth for the material of U.S. Pat. No. 2,773,851. That is an asbestos-containing product. However, it is obvious that other asbestos-tile compositions, homogeneous vinyl tile compositions, and typical floor covering resin-containing limestone-filler compositions could be utilized. As a matter of fact, this particular process is particularly useful in processing non-asbestos-containing tile formulations into dimensionally stable tiles which do not have significant hot strength such as is provided in asbestos-containing tile compositions due to the presence of the asbestos. The chips are dropped into the calender structure which has roll 8 operating at 280°–310° F. with roll 6 operating at 180°–195' F. The nondistensible controlled release carrier 10, for example, a conventionally available reinforced silicone of Teflon TM belt which could be purchased from any number of different suppliers of such items, is heated in excess of 300° F. One belt that has been used successfully is a P-570T fiberglass reinforced silicone rubber belt available from Permacel Division of Johnson & Johnson. The calendered sheet and nondistensible controlled release carrier and are fed past heater 18, to raise the blanket temperature entering the design application station 20 to a temperature of 275°–290° F. and maintain the nondistensible release carrier temperature in excess of 300° F. in the case where a reinforced silicone belt is used. The design application station 20 has an upper roll 24 operating at about 150° F. surface temperature and a bottom roll operating at 300° F. The upper roll 24 is a rubber covered roll while the bottom roll 26 is a steel surface roll. The rolls 24 and 26 simultaneously adhere the heated calendered sheet 14 to the heated nondistensible controlled release carrier so that it will be maintained thereagainst during subsequent clear film lamination and mechanical embossing operations to prevent distortion and, at the same time, adheres the preprinted transfer paper to the top surface of the sheet 14. Simultaneously therewith, the rolls cause the transfer of the printed design and registration band on the transfer sheet to the upper surface of the calendered sheet 14 so that upon subsequent removal of the release paper, the printed design will stay on the upper surface of the calendered sheet 14. Downstream in the processing direction from the rolls 24 and 26 is positioned a cooled strip plate. This plate contains chilled water at a temperature of about 55° F., and it cools the transfer paper-calendered sheet interface to 270° F. or less so that the transfer paper may be stripped from the sheet and leave the design on the calendered sheet 14. In addition, the cool plate 26 is provided with an angled edge of about 120°, and this thus causes the transfer sheet to be stripped from and pulled in a direction backward from the path of travel of the calendered sheet 14. Both the cooled plate and angled stripping result in a clear removal of the transfer sheet from the calendered sheet so that the design is fully deposited on the calendered sheet and this sheet and not in any way delaminated from the nondistensble controlled release carrier during the removal of the transfer sheet. The sheet 14 now has a printed design thereon. It then moves to the laminating roll structure 32. Appropriate heaters 28 are utilized to bring the temperature of the printed sheet to 300°–320° F. to allow proper adherence of the clear wear layer prior to the time it moves to the laminating roll structure 32. The smooth upper laminating roll 34 is a cooled steel roll which is operated at a surface temperature of 60°–95° F. and allows even adherence of the clear film wear layer to the calendered sheet. The lower rubber covered roll 36 is not provided with either heat or cooling, but runs at the ambient temperature of the surface it contacts. The rolls 34 and 36 are mounted upon a conventional Fife guiding system which is utilized to maintain the longitudinal edge of the calendered sheet in a certain position. Simultaneously, at the time that the printed design is placed upon the print transfer sheet, a registration band is placed adjacent the printed design. This registration band is basically a dark line about ⅛" wide, and it is provided with ⅛"×5/16" wide nonprinted areas or marks at the end of every repeat pattern. A standard Fife photoelectric eye guiding system is used to sense the continuous edge of registration band and control the Fife guider so that the longitudinal edge of the sheet 14 is aligned with the embossing roll 42. This is referred to as a cross machine direction registration. The rolls 34 and 36 laminate the clear wear layer, e.g., poly(vinyl chloride) film 26 to the printed surface of the sheet 14 to provide the composite structure of a clear wear layer, printed design and base sheet 14. Naturally, other clear wear layers such as nylon, Surlyn TM, etc., such as are used in the floor covering art, may be utilized as the wear layer film. Heaters 38 maintain the temperature of the composite sheet at 300°–320° F. prior to the time it enters the embossing rolls 40. The embossing roll 42 is maintained at a surface temperature of less than 90° F., and it is a steel roll utilized in conjunction with the rubber back-up roll 44. Roll 44 is neither heated nor cooled but runs at the ambient temperature of the surface it contacts. A Bobst-Champlain sensing unit, such as taught in U.S. Pat. No. 3,915,090, is issued in conjunction with the embossing roll to sense the nonprinted registration areas on the registration band so that the embossed pattern of the embossing roll is placed in registration along the machine direction with the printed design. As was indicated above, the ⅛"×5/16" wide nonprinted registration areas are positioned at the end of each repeat pattern, and the embossing roll is maintained in a conventional manner in registration with the repeated printed pattern so that the embossing repeats to the same extent that the printing repeats and that they are, therefore, in registration.

The appropriate water spraying means 46 then cools the printed composite sheet now carried by the nondistensible controlled release carrier. The composite sheet is now composed of the calendered base material 14 with a printed design thereon and a mechanically embossed-in-register clear wear layer thereover. Cooling is carried out until the composite sheet reaches a temperature of 80°–100° F. At this time, the nondistensible controlled release carrier passes around a roller at point 48. Separation of the composite sheet and silicone belt occur at this point 48 due to the cold release characteristic and change in direction of the nondistensible controlled release carrier. The composite sheet is then picked up by a conventional vacuum roll 50 which holds the sheet due to a vacuum being pulled on the interior of the roll. This roll assembly then pushes the composite sheet towards the cutter 52. The cutter 52 is simply two rolls, the upper roll of which has a cutter bar extending transversely across the roll. This is called a conventional fly knife cutter. Again, a Bobst-Champlain control unit senses the nonprinted registration areas and operates the rotation of the upper roll of the fly cutter so that the blade of the fly cutter will cut the sheet into a plurality of individual tile units with the cut occurring at the midpoint of the nonprinted registration area. This then provides a number of tile units which had formerly existed in a one after the other pattern down along the longitudinal length of the sheet into a number of individual tile units that have been cut from the sheet in registry with the printed design thereon. The individual tile units are then picked up by another conveyor structure 54 and passed through an annealing over 56 and cooling section 57. The tile units are heated to a temperature of 210°-220° F. They are then permitted to stay at this temperature for stress relaxation on a moving carrier that does not adhere to the tile and are then subsequently cooled to a temperature of 80°-105° F. A typical annealing cycle for 30'/minute line speed would be a 90 second heating period, 90 second dwell time for stress relaxation and 90 second cooling time. Naturally, the heating and cooling time is altered according to the line speed and product composition. This then provides a tile unit which is now ready for final sizing, packing, and shipping.

What is claimed is:

1. A method of making a floor covering product comprising the steps of:
   (a) calendering into a base layer sheet a heated mass of particles of thermoplastic material;
   (b) depositing said sheet of thermoplastic material upon a heated nondistensible controlled release carrier that exhibits hot adherence and cold release;
   (c) conveying said sheet of thermoplastic material and the nondistensible controlled release carrier past heaters to achieve the correct temperatures for design application and adherence of the sheet to the carrier;
   (d) laminating at the design application station a preprinted transfer paper containing a design and registration band printed thereon to the heated surface of the sheet material with pressure and simultaneously adhering said sheet to the nondistensible controlled release carrier to prevent subsequent distortion;
   (e) cooling said transfer paper and then removing said transfer paper from the sheet material leaving a printed design on the sheet material and the sheet material still adhered to the nondistensible controlled release carrier, said transfer paper being stripped from and pulled in a direction backward from the path of travel of the sheet material whereby the stripping results in clean removal of the transfer paper from the sheet material;
   (f) applying a clear film wear layer to the surface of the sheet material with even adherence to the clear film wear layer to the sheet material simultaneous with the cross machine direction alignment of the printed sheet material adhered to the nondistensible controlled release carrier to the embossing roll;
   (g) subsequently embossing-in-register the composite sheet material without distortion thereof, said sheet material consisting of a base layer, printed design and clear wear layer;
   (h) cooling said composite sheet material;
   (i) stripping said composite sheet from the undistensible controlled release carrier by said cooling and change in direction of the carrier;
   (j) cutting said composite sheet in register with said design thereon into a number of individual tile units;
   (k) annealing said tile units to stress relieve said tile units; and
   (l) final sizing said tile units.

* * * * *